(12) United States Patent
Zander et al.

(10) Patent No.: US 11,730,155 B2
(45) Date of Patent: Aug. 22, 2023

(54) ROTATIONAL FRICTION BRAKE ACTUATED AND REGULATED BY ANGULAR ACCELERATION AND A FISHING REEL COMPRISING THE SAME

(71) Applicant: BRILLIANZE SWEDEN AB, Svedala (SE)

(72) Inventors: Sten Thore Zander, Trelleborg (SE); Patrik Zander, Ystad (SE)

(73) Assignee: Brillianze Sweden AB, Svedala (SE)

( * ) Notice: Subject to any disclaimer, the term of this patent is extended or adjusted under 35 U.S.C. 154(b) by 162 days.

(21) Appl. No.: 17/414,506

(22) PCT Filed: Dec. 18, 2019

(86) PCT No.: PCT/EP2019/085925
§ 371 (c)(1),
(2) Date: Jun. 16, 2021

(87) PCT Pub. No.: WO2020/127466
PCT Pub. Date: Jun. 25, 2020

(65) Prior Publication Data
US 2022/0061285 A1 Mar. 3, 2022

(30) Foreign Application Priority Data

Dec. 19, 2018 (SE) .................................. 1851614-6

(51) Int. Cl.
*A01K 89/01* (2006.01)
*A01K 89/0155* (2006.01)
(Continued)

(52) U.S. Cl.
CPC ..... *A01K 89/01557* (2015.05); *B65H 75/406* (2013.01); *B65H 75/4447* (2013.01);
(Continued)

(58) Field of Classification Search
CPC .......... A01K 89/01557; A01K 89/0155; B65H 75/4447; B65H 75/4442; F16D 59/00; F16D 59/02; F16D 2127/002; F16D 51/16

See application file for complete search history.

(56) References Cited

U.S. PATENT DOCUMENTS

| 2,055,358 A | 9/1936 | Maynes |
| 3,587,474 A | 6/1971 | Fuchs |

(Continued)

FOREIGN PATENT DOCUMENTS

| WO | 2017/140734 A1 | 8/2017 | |
| WO | WO-2017140734 A1 * | 8/2017 | ......... A01K 89/0155 |
| WO | WO-2022015233 A1 * | 1/2022 | |

*Primary Examiner* — Emmanuel M Marcelo
(74) *Attorney, Agent, or Firm* — Volpe Koenig

(57) ABSTRACT

A rotational friction brake actuated and regulated by the rate of change of the angular speed is disclosed. The rotational friction brake includes a first body and a second body rotationally attached to the first body. The second body is arranged to rotate around a rotational center axis of the second body. An actuator arrangement is configured to move a second friction surface into frictional engagement with a first friction surface. The actuator arrangement includes an actuator arm pivotably attached to the second body in a pivot point that is eccentrically offset to the rotational center axis. The actuator arrangement has a radius of gyration (RG) longer than a distance from the pivot point to the rotational center axis. The actuator arrangement has an internal flexibility which allows its shape to depend on centrifugal forces. A fishing reel comprising such a rotational friction brake is also disclosed.

15 Claims, 7 Drawing Sheets

(51) Int. Cl.
*B65H 75/40* (2006.01)
*B65H 75/44* (2006.01)
*F16D 59/00* (2006.01)
*F16D 127/00* (2012.01)

(52) U.S. Cl.
CPC ........ *F16D 59/00* (2013.01); *B65H 2403/725* (2013.01); *B65H 2701/355* (2013.01); *F16D 2127/002* (2013.01)

(56) References Cited

U.S. PATENT DOCUMENTS 6,076,640 A 6/2000 Carlson
2019/0338814 A1* 11/2019 Zander .................... F16D 51/16

* cited by examiner

ROTATIONAL FRICTION BRAKE ACTUATED AND REGULATED BY ANGULAR ACCELERATION AND A FISHING REEL COMPRISING THE SAME

CROSS REFERENCE TO RELATED APPLICATIONS

This application is the U.S. National Stage, under 35 U.S.C. § 371, of International Application No. PCT/EP2019/ 085925, filed Dec. 18, 2019, which claims the benefit of Swedish Application No. 1851614-6, filed Dec. 19, 2018, and the entire contents of both applications are incorporated herein by reference.

TECHNICAL FIELD

The present disclosure relates to a rotational friction brake for braking a rotating body, and more particularly to a rotational friction brake wherein the braking power is regulated and actuated by the rate of change of the angular speed of the rotating body. The present disclosure further relates to a fishing reel comprising such a rotational friction brake.

BACKGROUND

Rotational friction brakes are well known in the art. Examples of such brakes are disc brakes, drum brakes etc. They all have in common that they in one way or another subject a rotating body to pressure from one or more braking members on one of the surfaces of the rotating member, these surfaces being for example inside an enveloped surface of the rotating body, outside an enveloped surface of the rotating body, or on a plane side of the rotating body. One example of such brakes are centrifugal brakes.

In some applications, it may be beneficial to regulate a braking action based on the rate of change of the angular speed. Dependent on the situation, the braking action may occur for a positive rate of change of the angular speed, i.e. a positive angular acceleration, or a negative rate of change of the angular speed, i.e. a negative angular acceleration also referred to as an angular deceleration. There are several potential benefits of such a brake. One advantage is that the actuation of the brake does not have to depend on the rotational speed, such as for centrifugal brakes. This implies that rotational friction brakes of the disclosure may be designed so as to actuate at high angular speeds as well as at low angular speeds, provided that a rate of change of the angular speed is varied. This opens up for many potential applications. The brake may for example be used as an emergency brake to reduce angular speed in various applications. The brake may be used to actuate in response to an increasing angular speed, as well as in response to a decreasing angular speed.

An application where a positive rate of change of the angular speed may be used to actuate the brake is in the trolley system on elevators. In case of a malfunction wherein the elevator starts to accelerate downwards too fast, an angular brake actuated by positive angular acceleration may be allowed to activate thus reducing, or stopping to a halt, the downward motion of the elevator already before a dangerous speed is reached.

An application where a negative rate of change of the angular speed may be used to actuate the brake is in a trailer, such as e.g. an automobile trailer. In a situation where an automobile driver wants to reduce the speed of the vehicle and trailer, and for that reason actively actuates the automobile brakes, the rotational friction brake in the trailer wheels may be designed so as to react on the negative rate of change experienced on the rotating body (e.g. wheels of the trailer) due to an active braking by the driver. An actuation of the rotational friction brake in the trailer wheels may then automatically brake the trailer in response to a deceleration of the towing automobile. This may reduce the stopping distance and help in preventing trailer jack-knife accidents.

A specific advantage of the rotational friction brake is that it may be used for applications where high angular speeds are required. In such applications, centrifugal brakes are less suitable as they may considerably limit the angular speed.

A typical example of applications where this is a problem is systems such as e.g. cable drums, water hoses, large paper rolls and sewing thread rolls, windlasses, mooring devices, anchoring devices, wire guided torpedoes/missiles etc. These systems typically comprise a product (e.g. a cable, a hose, paper or thread) which is winded onto a spool at a plurality of revolutions.

An application where a negative rate of change of the angular speed may be used to actuate the brake is for fishing reels. The application is a typical example of a system where there is a need to promptly release a large quantity of a product from a spool, and that results in a considerable positive angular acceleration of the spool as the product is pulled from it. The phase of positive angular acceleration of the spool will end as soon as the pulling force on the product is zero. Unfortunately, the inertia of the spool will act to continue the unwinding, resulting in considerable risk of the product still contained on the spool to become entangled in itself, in the spool and in other mechanical parts in its vicinity.

A fishing reel comprises a frame and a line spool rotatably mounted in the frame. To prevent the spool during casting, from rotating at such a high speed that the line cannot be paid out at the same rate but instead rises forming a so-called birds nest (also called backlash), fishing reels are often equipped with a rotational braking system, usually comprising a combination of rotational brakes of different kinds, such as for example one or more friction brakes (e.g. centrifugal brakes, spool tension brakes etc.) and a magnetic brake. During a cast, the angular speed of the line spool increases rapidly to maximum speed during a relatively short, initial phase of positive angular acceleration, to thereafter decrease during a longer phase of negative angular acceleration (deceleration).

The inventor has previously disclosed an improved rotational friction brake for the purpose of overcoming many of the problems associated with rotational friction brakes of the art. The solution is presented in a previous patent application, WO 2017/140734 A1 and is a pure mechanical solution. The rotating body is equipped with a braking arm which is rotationally attached to the rotating body in a pivot point, which is radially offset from the rotational center axis of the rotating body. The braking arm has a mass center which is placed at a distance from the pivot point which is longer than the radial distance between the rotational center axis and the pivot point. Furthermore, the braking arm is arranged such that the mass center is located in vicinity of the axis defined by the pivot point and the rotational center axis. This solution allows for reducing the influence of centrifugal forces on the braking arm, while instead increasing the influence of angular acceleration and/or deceleration of the rotating body on the braking arm.

A problem with the rotational friction brake of WO 2017/140734 A1 is that the degree of deceleration/acceleration required to actuate the rotational friction brake has been found to increase with angular speed of the rotating body. For applications requiring a short stop distance, quick reaction time is needed. The higher rotational speed the quicker the brake system must react. If the body which needs to be stopped is equipped with components of low internal friction such as high quality ball bearings, the problem increases as self-deceleration rate is lower. This makes it sometimes difficult to control the brake for a broader range of angular speed. In the case of fishing reels, this may be especially cumbersome, as angular speeds may be very high, reaching typically, 20 000-30 000 rpm at casting. There is thus a need in the art for an improved rotational friction brake which may provide a larger working velocity range of operation.

SUMMARY

It is an object to mitigate, alleviate or eliminate one or more of the above-identified deficiencies in the art singly or in any combination and solve at least the above mentioned problem. According to a first aspect there is provided a rotational friction brake actuated and regulated by the rate of change of the angular speed, comprising:

a first body having a first friction surface, a second body rotationally attached to the first body, the second body being configured to rotate around a rotational center axis of the second body, an actuator arrangement configured to move a second friction surface into frictional engagement with the first friction surface, the second friction surface being configured to rotate together with the second body, the actuator arrangement comprising:

an actuator arm being configured to rotate together with the second body and being pivotably attached to the second body in a pivot point, wherein the pivot point is eccentrically offset to the rotational center axis along a radial axis, wherein the actuator arrangement has a geometrical mass center, the pivot point and the geometrical mass center defining an actuator axis, wherein the actuator arrangement further has a radius of gyration relative to the pivot point as seen in the actuator arrangement's rotation together with the second body, the radius of gyration being longer than a distance between the pivot point and the rotational center axis, wherein the actuator axis intersects the pivot point, forming an angle $\alpha$ to a normal axis, the normal axis being defined perpendicular to the radial axis through the pivot point, and wherein the second friction surface is arranged to frictionally engage with the first friction surface for values of $\alpha$ being equal to, or larger than, a first angle $\alpha_1$, and a stop member configured to limit the movement of the actuator arrangement relative to the second body, such that the angle $\alpha$ is limited to a minimum angle larger than a second angle $\alpha_2$, at which angle the actuator arrangement is in a non-braking position, wherein the first angle $\alpha_1$ is larger than the second angle $\alpha_2$, and wherein the second angle $\alpha_2$ is within the range $80°<\alpha_2<100°$, and wherein the actuator arrangement has an internal flexibility which allows a shape of the actuator arrangement to depend on centrifugal forces acting thereon, said internal flexibility being configured such that:

(a) the angle $\alpha_1$ depends on the angular speed of the rotating second body, and/or (b) the angle $\alpha_2$ depends on the angular speed of the rotating second body, and/or (c) a portion of the actuator arrangement, when being in the non-braking position, makes contact with a portion of the first or second bodies in response to the angular speed of the second body exceeding an angular speed threshold, thereby transmitting a force from said contact to the actuator arm so as to facilitate actuation of the brake, wherein the actuator arrangement is configured to move in relation to the second body from the non-braking position to a braking position at which the second friction surface comes into frictional engagement with the first friction surface so as to actuate the rotational friction brake.

The rotational friction brake is a mechanical, autonomous and self-adjusting rotational friction brake. By allowing inertial forces, which arise due to a rate of change of the angular speed, to dominate over, or at least effectively contribute together with, centrifugal forces arising due to the angular speed itself, the brake may be actuated (activated) as well as regulated by the rate of change of the angular speed. The key mechanical component of the brake is the actuator arrangement, and even more specifically so, the actuator arm of the actuator arrangement. The key is to balance the brake so as to allow the actuation to occur at the most suitable threshold value for the rate of change of the angular speed. Which threshold value being most suitable will depend on the application. Dependent on the rotational direction of the second body, and the position of the stop member, the brake will be actuated by a positive or a negative rate of change. When using the brake for the purpose of reducing the angular speed of a drum, for example in a fishing reel, the brake is typically configured so as to actuate on a negative rate of change of the angular speed. Using the fishing reel as an example, the operation of the rotational friction brake will be as follows: During the first phase of a cast, the drum will accelerate and hence the rate of change of the angular speed is positive. This will force the actuation arrangement towards the stop member to reside in the non-braking position due to inertial forces acting on the actuation arrangement. After some time, the acceleration will seize, and the drum will experience a deceleration (i.e. a negative rate of change of the angular speed). At a particular threshold value of the rate of change of the angular speed, the actuator arrangement will move from the non-braking position towards the braking position to actuate the brake.

The normal axis is defined perpendicular to the radial axis. Furthermore, the normal axis is preferably defined perpendicular to the rotational center axis. Thus, the angle $\alpha$ is preferably defined in a plane being orthogonal to the rotational center axis. Thus, the actuator arrangement may preferably be configured to move in relation to the second body in the plane being orthogonal to the rotational center axis. This may be achieved by the actuator arrangement being configured to rotate around a pivot axis intersecting the pivot point, said pivot axis being parallel with the rotational center axis. It is however conceivable that the normal axis forms an oblique angle to the rotational center axis. In such a case, the actuator arrangement may be configured to move in relation to the second body in a plane forming said oblique angle to the rotational center axis. For example, the actuator arrangement may be configured to move such that a distal end of the actuator arm increases its distance to the second body with increasing angle $\alpha$. This may be achieved by the actuator arrangement being configured to rotate around a pivot axis intersecting the pivot point, said pivot axis forming said oblique angle with the rotational center axis.

At the braking position, the actuator arrangement is residing in a position in relation to the second body at which the first and second friction surfaces meet each other. This occurs when the actuator axis forms the angle $\alpha_1$ to the normal axis. It should be understood that for some embodiments the angle $\alpha$ may increase so as to exceed the angle $\alpha_1$. Thus, for some embodiments there will be a range of values for the angle $\alpha$ at which the rotational friction brake is braking. It is understood that the term "braking position" as used herein only defines the position defining the transition between contact and non-contact of the first and second friction surfaces.

At the non-braking position, the actuator arrangement is disposed so as to be in contact with the stop member, and the actuator axis forms the angle $\alpha_2$ with the normal axis. The non-braking position thus defines a rest position for the actuator arrangement. During operation, the actuator arrangement may be forced to stay in the non-braking position due to inertial forces acting thereon. In response to a variation in the rate of change of the angular speed of the second body, inertial forces acting on the actuator arrangement allows it to leave the non-braking position. As realized by the skilled person, the rotational friction brake in in an inactive state (i.e. does not initiate braking) for all values of the angle $\alpha$ defined between the angle $\alpha_1$ and $\alpha_2$. However, it is understood that the term "non-braking position" as used herein only defines the position at which the actuator arrangement is in contact with the stop member.

As the angles $\alpha_1$ and $\alpha_2$ may depend on the angular speed of the rotating second body, it is further understood that the braking position and the non-braking position also may vary and thus obtain different absolute values of the angle $\alpha$ for different angular speeds.

The actuator arrangement has a geometrical mass center and a radius of gyration, the latter defined with reference to the pivot point at which it is attached to the second body. A key feature of the rotational friction brake is that the radius of gyration of the actuator arrangement is longer than the distance between the pivot point and the rotational center axis. This achieves the effect that the actuator arrangement reacts to the rate of change of the angular speed in an optimum way. Discussing the example of a rotational friction brake actuated by a negative rate of change of the angular speed, the effect of this feature is that the actuator arrangement, during a positive rate of change of the angular speed of the second body, will be experiencing a moment at the pivot point, which will force the actuator arrangement to make contact with the stop member to reside in the non-braking position. As the rate of change of the angular speed decreases below a threshold value, the actuator arrangement will move to the braking position, such that the second friction surface meets the first friction surface to actuate the brake.

An alternative way of describing inertial forces on the actuator arrangement is to relate to a center of gyration of the actuator arrangement. The radius of gyration is the distance from the pivot point to said center of gyration. As readily understood by the skilled person, the feature: the radius of gyration being longer than a distance between the pivot point and the rotational center axis, could alternatively be expressed as: the distance between the center of gyration and the pivot point being longer than a distance between the pivot point and the rotational center axis.

The geometrical mass center, which may have a distance to the pivot point different from the radius of gyration (i.e. be distanced from the center of gyration), may be located in a vicinity of the radial axis. This may be a preferred embodiment of the brake having only one actuator arm. In other words, the angle $\alpha$ may preferably be within a range of angles located around 90°. For example, the angle $\alpha$ may be within the range $80°<\alpha<110°$. This serves to minimize the relative influence of the centrifugal forces on the actuator arrangement, making the actuator arrangement more susceptible to inertial forces exerted thereon in response to a rate of change of the angular speed of the rotating second body.

Moreover, the angle $\alpha_2$, which angle defines the non-braking position of the actuator arrangement, should not be too far from 90°, as angles of $\alpha_2$ located too far from 90° may result in the influence of centrifugal forces on the actuator arrangement being too high, hence risking hindering actuation of the brake in response to variation in the inertial forces. For this reason, the angle $\alpha_2$ may be within the range $80°<\alpha_2<100°$. However, the angle interval of $\alpha_2$ may differ dependent on the embodiment. Thus, the second angle $\alpha_2$ may alternatively be within the range $85°<\alpha_2<95°$. The second angle $\alpha_2$ may alternatively be within the range $88°<\alpha_2<92°$. The second angle $\alpha_2$ may alternatively be within the range $85°<\alpha_2<90°$. The second angle $\alpha_2$ may alternatively be within the range $88°<\alpha_2<90°$. The second angle $\alpha_2$ may alternatively be within the range $90°<\alpha_2<95°$. The second angle $\alpha_2$ may alternatively be within the range $90°<\alpha_2<92°$. It should be understood that the preferred angle interval of $\alpha_2$ may depend on if the rotational friction brake is configured to be actuated by a positive rate of change of the angular speed or a negative rate of change of the angular speed.

The distance between the geometrical mass center and the pivot point may be different from the radius of gyration, said difference depending on the overall shape of, and distribution of mass within, the actuator arrangement. In an ideal theoretical case of the entire mass of the actuator arrangement being placed in its geometrical mass center, the distance between the geometrical mass center and the pivot point will be equal to the radius of gyration (ideal pendulum approximation). Expressed in terms of the center of gyration, in the ideal theoretical case of the entire mass of the actuator arrangement being placed in its geometrical mass center, the center of gyration will coincide with the geometrical mass center. This ideal theoretical case may form a fair approximation for embodiments utilizing a relatively low-weight structure and a counter weight disposed thereon. Thus, for such embodiments, the actuator arrangement will be configured such that the geometrical mass center is placed at a distance from the pivot point that is longer than the distance between the pivot point and the rotational center axis.

For embodiments where the distance between the geometrical mass center and the pivot point differs from the radius of gyration, it may still be preferred to have the geometrical mass center placed at a distance from the pivot point that is longer than a distance between the pivot point and the rotational center axis. An effect of this feature may be that the net centrifugal force acting on the geometrical mass center of the actuator arrangement will have a composant directed away from the pivot point, thus helping to balance the relative position of the actuator arrangement with respect to the rotating second body during a movement of the actuator arrangement between the non-braking position and the braking position.

However, for embodiments where the distance between the geometrical mass center and the pivot point differs from the radius of gyration, it is also conceivable that the geometrical mass center is placed at a distance from the pivot point that is equal to, or shorter than, the distance between the pivot point and the rotational center axis. However, for all embodiments, the radius of gyration is longer than the distance between the pivot point and the rotational center axis.

The present invention presents a solution to the aforementioned problem by allowing the actuator arrangement to have an internal flexibility. The flexibility may be tailored in different ways depending on the kind of rotational friction brake and the kind of intended use thereof. The internal flexibility of the actuator arrangement allows for utilizing the centrifugal forces acting on the actuator arrangement due to the rotational motion of the second body to structurally reshape the actuator arrangement as will be apparent also in the appended dependent claims as well as in the example embodiments disclosed herein. There are three principal ways of utilizing the internal flexibility, and these three ways have somewhat different advantages and technical effects. The three ways are:

a) The actuator arrangement may have an internal flexibility configured such that the angle $\alpha_1$ depends on the angular speed of the rotating second body. The angle $\alpha_1$ defines the position of the actuator arrangement at which the first and second friction surfaces meet each other. In other words, the angle $\alpha_1$ marks the braking position of the actuator arrangement. By allowing the internal flexibility of the actuator arrangement to affect the value of $\alpha_1$, it may be possible to achieve different braking power at different angular speeds. For larger values of $\alpha_1$, the geometrical mass center of the actuator arrangement will extend further from the rotational center axis of the second body, which increases overall centrifugal forces on the actuator arrangement, and hence, the braking power. Another advantage of allowing the internal flexibility of the actuator arrangement to affect the value of $\alpha_1$ may be that, for smaller values of $a_1$, the temporal response of the actuator arrangement will increase, as the actuator arrangement has to move fewer degrees from the non-braking position at the angle $\alpha_2$ to the braking position at the angle $\alpha_1$.

b) The actuator arrangement may have an internal flexibility configured such that the angle $\alpha_2$ depends on the angular speed of the rotating second body. The angle $\alpha_2$ defines the angle at which the actuator arrangement is supported in place by the stop member. In other words, the angle $\alpha_2$ marks the non-braking position of the actuator arrangement. By allowing the internal flexibility of the actuator arrangement to affect the value of $\alpha_2$ it may be possible to achieve different actuation behavior of the rotational friction brake for different angular speeds. If, for example, the rotational friction brake rotates at a high angular speed, it may be advantageous to allow the rate of change at which the brake is actuated to be lower than for the same brake rotating at a lower angular speed. Yet another advantage of allowing the internal flexibility of the actuator arrangement to affect the value of $\alpha_1$ may be that it allows for shifting the actuation properties of the brake from being actuated at a negative rate of change of the angular speed when the angular speed is within a first range of angular speeds, to being actuated by a positive rate of change of angular speed when the angular speed is in a second, different, range of angular speeds. For example, for a brake generally actuated by a negative rate of change of the angular speed, such as a brake used in a fishing reel, there may be situations where the angular speed of the rotating second body increases to unwanted levels and it is beneficial, or even necessary, to apply at least some braking power so as to reduce, or limit, the rotational speed even though the rotating second body is still experiencing a positive rate of change of the angular speed. In such situations, the internal flexibility may allow for shifting the geometrical mass center (i.e. the angle $\alpha_2$) such that the rotational friction brake shifts from being actuated by a negative rate of change of the angular speed to a positive rate of change of the angular speed (or vice versa for a brake being generally actuated by a positive rate of change). Thus, the brake may be actuated if the angular speed exceeds a maximum allowed threshold value. As realized by the skilled person, these aspects may be accomplished in one and the same embodiment of the brake. The difference is merely the degree of change of the actuation properties.

c) The actuator arrangement may have an internal flexibility configured such that a portion of the actuator arrangement, when being in the non-braking position, makes contact with a portion of the first or second bodies in response to the angular speed of the second body exceeding an angular speed threshold, thereby transmitting a force from said contact to the actuator arm, so as to facilitate actuation of the brake. In other words, the actuator arrangement may be configured such that, in response to an angular speed of the second body exceeding a specific angular speed threshold, the actuator arrangement will come into contact with another part of the rotational friction brake and, in turn, be affected by a force. This force may contribute, either positively or negatively, to the threshold rate at which the actuator arrangement leaves the non-braking position to actuate the brake. It should be understood that this kind of flexibility does not require a variation in the angle $\alpha_2$ (aspect (b)). It may, however, achieve a similar effect on the actuation arrangement, i.e. to facilitate actuating the brake.

It is to be understood that the three ways detailed herein is part of a common inventive concept, i.e. to utilize the forces created by the rotation of the actuator arrangement with the rotating second body to adjust the behavior of the actuator arrangement in the rotational friction brake as function of angular speed.

Preferably, the internal flexibility is configured such as to include one or more of the features (a), (b) and (c) disclosed herein.

It is conceivable that the internal flexibility is configured such as to include the features (a) and/or (b), and optionally the feature (c).

It is further conceivable that the internal flexibility is configured such as to include the features (a) and/or (c), and optionally the feature (b).

It is further conceivable that the internal flexibility is configured such as to include the features (b) and/or (c), and optionally the feature (a)

It is further conceivable that the internal flexibility is configured such as to include the feature (a), and optionally the features (b) and/or (c).

It is further conceivable that the internal flexibility is configured such as to include the feature (b), and optionally the features (a) and/or (c).

It is further conceivable that the internal flexibility is configured such as to include the feature (c), and optionally the features (a) and/or (b).

In other words, the internal flexibility may be configured such as to include any combination of the features (a), (b), and (c), and, alternatively, any combination of two of the features (a), (b) and (c), or alternatively, any one from the features (a), (b) and (c).

According to some embodiments, the first body is a drum and wherein the first friction surface is an inner portion of a peripheral wall of the drum.

According to some embodiments, the actuator arrangement has a center of gyration being distanced from the pivot point by the radius of gyration, wherein, when the actuator arrangement is in the non-braking position, the center of gyration of the actuator arrangement is located on one side of a plane, wherein the plane is orthogonal to the radial axis and intersects the rotational center axis, and wherein the center of gyration of the actuator arrangement is located on the side of the plane not containing the pivot point.

It may be advantageous to design the rotational friction brake such that the geometrical mass center of the actuator arrangement is located in a vicinity of the rotational axis. Thus, the distance between the geometrical mass center and the pivot point may be close to the distance between the pivot point and the rotational center axis. For example, the distance between the geometrical mass center and the pivot point may be within 95-105% of the distance between the pivot point and the rotational center axis. The second angle $\alpha_2$ may be close to 90°. For example, the second angle $\alpha_2$ may be within the range $86°<\alpha_2<94°$.

This may be advantageous as it allows for keeping the rotational friction brake more balanced during rotation, especially for rotational friction brakes having one arm only. It is however conceivable to balance the rotational friction brake in other ways, for example by adding counter weights on the rotating second body.

According to some embodiments, the rotational friction brake further comprises a preventing member arranged to be adjustable, allowing for the angle $\alpha$ to be limited to a maximum angle smaller than the angle $\alpha_1$, such that the preventing member prevents the second friction surface from frictionally engaging with the first friction surface. The preventing member may be advantageous as it allows for manually disabling the rotational friction brake. This may be beneficial for example, when rotating the second body in a rotational direction opposed to the reference direction.

It is to be understood that the stop member and the preventing member may share at least one technical effect, i.e. to limit the at least one braking arm to a range of angles $\alpha$ within which the at least one braking arm is prevented from making contact with the first body, thus disabling braking action altogether. For example, the rotational friction brake may further comprise a locking mechanism arranged to fix the at least one braking arm in relation to the second body when the braking member is not frictionally engaging the first body. The locking mechanism may be configured to engage with the preventing member, holding the preventing member in a position at which the actuator arrangement is prevented from being in the braking position.

For some embodiments, the stop member is fixed and typically determine if the brake is actuated by positive or negative rate of change of the angular speed, when operated such that the second body rotates in the reference direction. For such embodiments, the preventing member is typically movable and used to manually disable the brake. However, in alternative embodiments, also the stop member may be adjustable, allowing for the second angle $\alpha_2$ to be adjusted. Such embodiments may allow for reconfiguring the rotational friction brake so as to adjust its actuation properties, i.e. adjust the angle $\alpha_2$ and thereby the threshold value for the rate of change of the angular speed at which the actuator arrangement moves from the non-braking position to the braking position to actuate the brake.

According to some embodiments, the actuator arrangement comprises a portion made of a material with higher density than the average density of the actuator arrangement, allowing for the geometrical mass center of the actuator arrangement to be positioned within, or close to, said portion. The portion may be a mass element attached to a part of a structure of the actuator arrangement.

According to some embodiments, the internal flexibility is configured at least such that the angle $\alpha_2$ depends on the angular speed of the rotating second body, and wherein the actuator arm comprises a mass element flexibly connected thereto, wherein the mass element is displaceable along a displacement direction which forms an angle with the actuator axis, so as to provide at least part of said internal flexibility of the actuator arrangement. The mass element may be flexibly connected to the actuator arm by means of an elastic, or resilient, material such as a spring, or rubber. It is conceivable that the displacement direction may be adjustable so as to adjust the influence of the angular speed on the angle $\alpha_2$. According to some embodiments, the mass element is displaceable within an opening of the actuator arm.

According to some embodiments, the position of the mass element with respect to the actuator arrangement is manually adjustable. By allowing the mass element to be manually adjustable, it may be possible to adjust the behavior of the rotational friction brake. For example, the distance between the mass element and the pivot point may be adjusted. Alternatively, or additionally, the position of the mass element may be adjusted so as to adjust the angle $\alpha_2$. It is understood that the manual adjustment is carried out when the brake is not rotating, i.e. the manual adjustments is not the same as the dynamically driven displacement of the mass element due to the rotational motion of the second body.

According to some embodiments, the internal flexibility is configured at least such that the angle $\alpha_2$ depends on the angular speed of the rotating second body, and wherein the actuator arm comprises two or more actuator arm elements which are flexibly, and rotationally, connected to each other so as to provide at least a part of said internal flexibility of the actuator arrangement.

According to some embodiments, the actuator arm comprises a first actuator arm element and a second actuator arm element, wherein the first actuator arm element is rotationally attached to the pivot point in a proximal end thereof, and, at a distal end thereof, flexibly, and rotationally, connected to a proximal end of the second actuator arm.

The actuator arm elements may be flexibly, and rotationally, connected to each other by means of a spring. Alternatively, the actuator arm elements may be flexibly, and rotationally, connected to each other by means of a flexible material, such as rubber or polymer material.

According to some embodiments, the internal flexibility is configured at least such that the angle $\alpha_2$ depends on the angular speed of the rotating second body, and wherein the actuator arrangement further comprises a further element being configured to rotate together with the second body and being pivotably attached to the second body in the pivot point, wherein the actuator arm and the further element are flexibly connected to each other so as to provide at least a part of said internal flexibility of the actuator arrangement.

According to some embodiments, the actuator arrangement further comprises the second friction surface fixedly, or flexibly, connected to the actuator arm.

According to some embodiments, the actuator arm comprises the second friction surface.

According to some embodiments, the internal flexibility is configured at least such that the angle $\alpha_1$ depends on the angular speed of the rotating second body, and wherein the actuator arrangement comprises a braking element comprising the second friction surface, wherein said braking element is flexibly connected to the actuator arrangement, and/or being in itself flexible, such that the angle $\alpha_1$ depends on the angular speed of the rotating second body so as to provide at least a part of said internal flexibility of the actuator arrangement. The braking element may be flexibly connected to the actuator arrangement by means of a flexible, or resilient, material. For example, the braking element may be flexibly connected to the actuator arrangement by means of one or more springs, selected from e.g. torsional springs and spring steels. It is also conceivable that the braking element is part of a braking member being pivotally connected to the actuator arrangement and that the braking member is flexibly connected to the actuator arrangement by means of a flexible, or resilient, material.

According to some embodiments, the internal flexibility is configured at least such that a portion of the actuator arrangement, when being in the non-braking position, makes contact with a portion of the first or second bodies in response to the angular speed of the second body exceeding an angular speed threshold, thereby transmitting a force from said contact to the actuator arm so as to facilitate actuation of the brake, and wherein the actuator arrangement further comprises an actuation lever flexibly connected to the actuator arrangement, and wherein said portion of the actuation arrangement is a contact member of the actuation lever, and said portion of the first or second bodies is the second friction surface.

According to some embodiments, the rotational friction brake further comprises a braking arrangement being configured to rotate together with the second body, wherein the braking arrangement comprises the second friction surface.

The braking arrangement may be configured to rotate together with the second body at the same angular speed. This implies that the braking arrangement does not follow the movement of the actuator arrangement around the pivot point. This may be advantageous as it allows for increasing degree of freedom in how to design the second friction surface.

According to some embodiments, the braking arrangement is an engaging element comprising the second friction surface, the engaging element having abutment surfaces being in abutment with corresponding abutment surfaces of the actuator arrangement, such that the actuator arrangement is configured to move the abutment surfaces of the engaging element to move, or stretch, the engaging element such that the second friction surface is moved towards the first friction surface to actuate the brake.

According to some embodiments, the second friction surface is defined on a resilient, or flexible, braking portion of the arrangement such that the arrangement is allowed to assume an angle $\alpha$ larger than the first angle $\alpha_1$ in response to the braking member being compressed. This implies that the rotational friction brake may allow for gradually increasing the friction, and hence the braking action, with an increase of the angle $\alpha$ for a case where the angle $\alpha$ exceeds the first angle $\alpha_1$.

The advantage of this embodiment may be that it adds further control to the movement of the actuator arrangement with respect to the rotating second body, and hence also adds further control over the braking power. The further control of the movement of the actuator arrangement is a result from the frictional forces giving rise to a moment, around the pivot in the reference system of the rotating second body, of the actuator arrangement which is directed either opposite to or in the same direction as a moment of the actuator arrangement arising from the centrifugal forces. The moment occurring due to the friction will thus strive to decrease the braking power. In the case of a decrease in braking power, a decrease in the moment arising from the centrifugal forces will occur, thus allowing for the system to be made self-balancing. The design using a flexible material facilitates utilization of this balance in a range of angles $\alpha$ larger than the first angle $\alpha_1$. By carefully choosing the elastic/resilient properties of the braking member, the braking power as function of $\alpha$ may be tailored.

The aspect of allowing the actuator arrangement to flexibly extend so as to reach angles $\alpha$ exceeding the first angle $\alpha_1$ should be conceptually separated from the previously disclosed aspect (a) even if they may share common features: The aspect (a) of the internal flexibility allows for adjusting the angle $\alpha_1$ with the angular speed. This means that the angular speed determines how close the first and second friction surfaces are to each other at the time of actuation, and hence influences a speed of actuation. The aspect of allowing the angle $\alpha$ exceeding the first angle $\alpha_1$, is instead associated with the braking power of the rotational friction brake, as is allows for the braking arrangement to reach larger angles $\alpha$ where centrifugal forces may increase the pressure with which the second surface presses against the first surface to create an increased braking power.

It is understood that both the aspect (a) and allowing for angles $\alpha$ exceeding the angle $\alpha_1$, may be obtained using the same embodiment of an internal flexibility. However, the two aspects are not always associated with each other. For example, if the second friction surface is defined on a rubber element being part of the actuator arrangement, the rubber element has an internal flexibility being too low to fulfil the aspect (a), but may still be compressed during braking so as to provide the aspect of the angle $\alpha$ exceeding the angle $\alpha_1$.

The rotational friction brake may be configured such that the second friction surface and the first friction surface meet each other only at a portion, or point, of surfaces thereof. This implies that, at the angle $\alpha_1$, portions of the friction surfaces are still not in contact. In case the second friction surface is defined on a flexible material, this allows for a gradual increase of an area of contact between the second friction surface and the first friction surface when the braking portion is being compressed.

According to some embodiments, the actuator arrangement further comprises one or more further actuator arms, each of the one or more further actuator arms being rotationally attached to the second body in a respective pivot point. The pivot points of the actuator arm and the one or more further actuator arms may preferably be arranged on equal distance from the rotational center axis and the pivot points being disposed equidistantly from each other. This may be advantageous as may ensure that the second body is balanced, enabling smooth rotation also at high angular speed. The actuator arm and the one or more further actuator arms may have the same properties, such as dimensions and weight. However, it is also conceivable that the actuator arms are different from each other such that they are arranged to react differently to the rate of change of the angular speed of the second body. This may be an advantage as it permits tailoring the behavior of the rotational brake for different acceleration regimes. As an example, a rotational brake may comprise two actuator arms. A first actuator arm may be arranged to react on a relatively low rate of change of the angular speed, whereas a second actuator arm may be arranged to react on a higher rate of change of the angular speed. The rotational brake of the example may hereby provide a braking power that show two distinct characteristics for two different ranges of rate of change of the angular speed of the second body.

According to some embodiments, the second body is part of, fixedly attached to or arranged to engage with a spool arranged to contain an elongated bendable object, wherein the elongated bendable object is winded around the spool at a plurality of revolutions. Systems comprising such bendable elongated objects may be for example spools housing electrical cables, wires, water hoses, paper, sewing cotton, anchor cables, anchor chains etc.

According to a second aspect there is provided a fishing reel comprising the rotational friction brake according to the first aspect, wherein the first body is part of, or fixedly attached to, the housing of the fishing reel and the second body is part of, fixedly attached to or arranged to engage with a line spool.

Effects and features of the second aspect is largely analogous to those described above in connection with the first aspect. Embodiments mentioned in relation to the first aspect are largely compatible with the second aspect. It is further noted that the inventive concepts relate to all possible combinations of features unless explicitly stated otherwise.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The invention will by way of example be described in more detail with reference to the appended schematic drawings, which shows presently preferred embodiments of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The disclosure relates to a rotational friction brake actuated and regulated by the rate of change of the angular speed. The brake is thus controlled by the forces and moments created as a result from its own rotational motion pattern. Most aspects of the interaction between the rotational motion and the braking actuation and regulation is disclosed in the Applicant's previous patent application WO 2017/140734 A1, to which the reader hereby is referred to build further understanding as to the fundamental principles of the behavior and operation of the brake.

Figure 1:
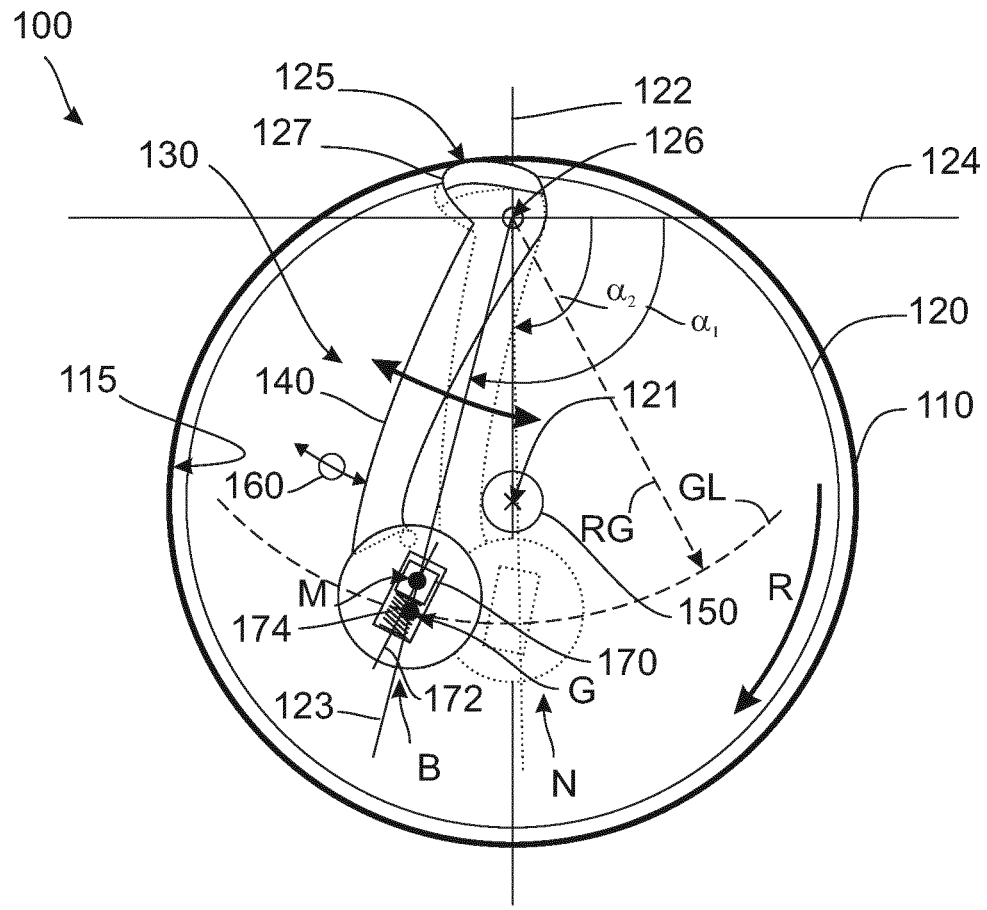
FIG. 1 shows a side view of a rotational friction brake according to an embodiment of the present disclosure.

FIG. 1 shows a rotational friction brake 100 actuated and regulated by the rate of change of the angular speed. The rotational friction brake 100 is an example of a rotation friction brake wherein the internal flexibility of the actuator arrangement 130 is configured such that the angle $\alpha_2$ depends on the angular speed of the rotating second body 120, i.e. the aspect (b).

The rotational friction brake 100 comprises a first body 110 having a first friction surface 115. The first body 110 of the example is a drum and the first friction surface 115 is an inner portion of a peripheral wall of the drum. The rotational friction brake 100 further comprises a second body 120 rotationally attached to the first body 110. The second body 120 is configured to rotate around a rotational center axis 121 of the second body 120. Typically, the rotational center axis 121 marks a position for a shaft rotationally attaching the second body 120 to the first body 110 e.g. via bearings or the like (not shown).

The rotational friction brake 100 further comprises an actuator arrangement 130 configured to move a second friction surface 125 into frictional engagement with the first friction surface 115. The second friction surface 125 is configured to rotate together with the second body 120.

The actuator arrangement 130 comprises an actuator arm 140 being configured to rotate together with the second body 120 and being pivotably attached to the second body 120 in a pivot point 126. The pivot point 126 is eccentrically offset to the rotational center axis 121 along a radial axis 122.

The actuator arrangement 130 has a geometrical mass center M and a radius of gyration RG relative to the pivot point 126 as seen in the actuator arrangement's rotation together with the second body 120. The radius of gyration RG may be close to, or even approximately equal to, the distance between the geometrical mass center M and the pivot point 126. In the example, the radius of gyration RG and said distance are relatively close to each other, indicating that the actuator arrangement 130 has relatively high degree of its mass concentrated in a vicinity of its geometrical mass center M. This may alternatively be expressed in terms of a center of gyration G of the actuator arrangement 130. In the example, the center of gyration G is relatively close to the geometrical mass center M.

The pivot point 126 and the geometrical mass center M defines an actuator axis 123. The actuator arm 140 is allowed to rotate around the pivot point 126 as illustrated by the double-arrow, and the circular path GL defined by the radius of gyration RG.

The radius of gyration RG is defined relative to the pivot point 126 as seen in the actuator arrangement's rotation together with the second body 120. The radius of gyration RG is longer than a distance between the pivot point 126 and the rotational center axis 121. This achieves the effect that the actuator arrangement 130 reacts to the rate of change of the angular speed in an optimal way. Discussing the example of a positive rate of change of the angular speed, the effect of this feature is that the actuator arrangement 130, during a positive rate of change of the angular speed of the second body 120, will be experiencing a moment at the pivot point 126, which may force the actuator arrangement 130 to make contact with the stop member 150 to reside in the non-braking position N. As the rate of change of the angular speed decreases below a threshold value, the actuator arrangement 130 may move to the braking position B, at which the second friction surface 125 meets the first friction surface 115 to actuate the brake 100.

The actuator axis 123 intersects the pivot point 126, forming an angle $\alpha$ to a normal axis 124. The normal axis 124 is defined perpendicular to the radial axis 122 through the pivot point 126. Furthermore, in the example the normal axis 124 is defined perpendicular to the rotational center axis 121 through the pivot point 126. Thus, the angle $\alpha$ is here defined in a plane being orthogonal to the rotational center axis 121. The second friction surface 125 is arranged to frictionally engage with the first friction surface 115 for values of $\alpha$ being equal to, or larger than, a first angle $\alpha_1$.

The rotational friction brake 100 further comprises a stop member 150 configured to limit the movement of the actuator arrangement 130 relative to the second body 120, such that the angle $\alpha$ is limited to a minimum angle larger than a second angle $\alpha_2$, at which angle the actuator arrangement 130 is in a non-braking position N, marked in FIG. 1 using dotted lines. The first angle $\alpha_1$ is larger than the second angle $\alpha_2$, and the second angle $\alpha_2$ is within the range $80°<\alpha_2<100°$. This allows for decreasing the relative influence of centrifugal forces on the actuator arrangement 130, hence risking hindering actuation of the brake 100 in response to variation in the inertial forces. The actuator arrangement 130 is configured to move in relation to the second body 120 from the non-braking position N to a braking position B at which the second friction surface 125 comes into frictional engagement with the first friction surface 115 so as to actuate the rotational friction brake 100.

The actuator arrangement 130 has an internal flexibility which allows a shape of the actuator arrangement 130 to depend on centrifugal forces acting thereon. The internal flexibility is for the example embodiment in FIG. 1 configured according to the feature (b) disclosed hereinabove. In other words, internal flexibility is configured such that the angle $\alpha_2$ depends on the angular speed of the rotating second body 120. This is achieved by the actuator arm 140 comprising a mass element 170 flexibly connected thereto by means of a spring 174. The mass element 170 is displaceable along a displacement direction 172 which forms an angle with the actuator axis 123. Thus, as readily realized by the skilled person, as the angular speed of the rotating second body 120 increases, the mass element 170 will experience increasing centrifugal forces which in turn forces the mass element 170 to further distance itself from the pivot point 126. As the displacement direction 172 is angled with respect to the actuator axis 123, the further displacement of the mass element 170 away from the pivot point will adjust the angle $\alpha_2$. In case the actuator arrangement 130 is residing in the non-braking position N, for example during an angular acceleration phase of the rotational friction brake 100, said displacement of the mass element 170 will allow for actuating the rotational friction brake 100 at a different threshold value of the rate of change of the angular speed at different angular speeds. By a careful choice of the angle between the actuator axis 123 and the displacement direction 172, the rotational friction brake 100 may be configured to actuate faster/easier at higher angular speeds than at lower angular speeds. Additionally, the rotational friction brake 100 may be configured to shift from actuating at a negative rate of change of the angular speed to a positive rate of change of the angular speed at a specific angular speed threshold. The latter aspect may be advantageously used to control the risk of overspeed, i.e. situations where the rotating second body 120 exceeds a maximum angular speed limit.

The rotational friction brake 100 further comprises a preventing member 160 arranged to be adjustable, allowing for the angle $\alpha$ to be limited to a maximum angle smaller than the angle $\alpha_1$, such that the preventing member 160 prevents the second friction surface 125 from frictionally engaging with the first friction surface 115. The preventing member 160 is typically a part of a deactivation mechanism for the brake useful for preventing unintentional braking, for example when the rotating second body 120 is to be actively rotated in the counter direction. For a fishing reel, this occurs during rewinding of the spool.

The actuation arm 140 comprises a braking portion 127 comprising the second friction surface 125. The braking portion 127 is arranged to be resilient, or flexible, such that the arrangement is allowed to assume an angle $\alpha$ larger than the first angle $\alpha_1$ in response to the braking member 127 being compressed. Thus, the rotational friction brake 100 may allow for gradually increasing the friction, and hence the braking action, with an increase of the angle $\alpha$ for a case where the angle $\alpha$ exceeds the first angle $\alpha_1$.

The example embodiment of FIG. 1 is an example of a rotational friction brake in which the actuator arrangement contains only one element, i.e. the braking arm 140. For such embodiments, the geometrical mass center M and radius of gyration RG of the actuator arrangement 130 is defined by the geometrical mass center and radius of gyration of the actuator arm 140.

Figure 2:
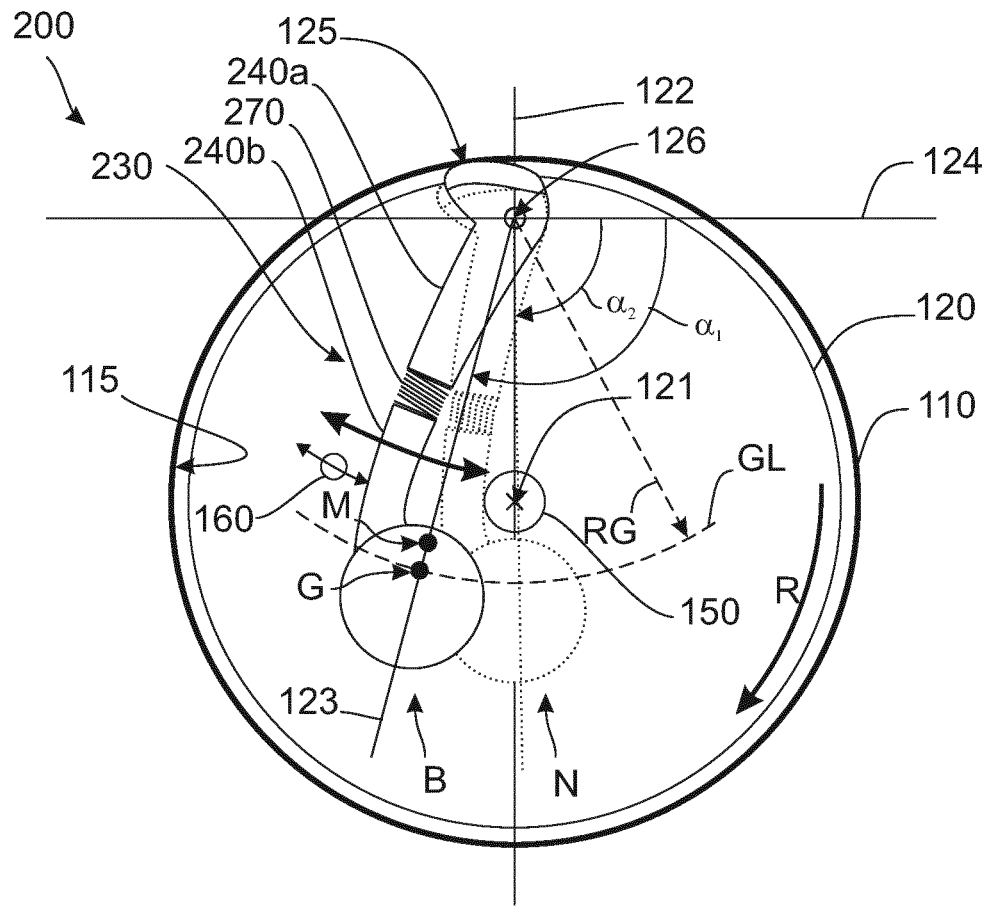
FIG. 2 shows a side view of a rotational friction brake according to another embodiment of the present disclosure.

FIG. 2 shows a rotational friction brake 200 according to another example embodiment. The rotational friction brake 200 is another example of a rotation friction brake wherein the internal flexibility of the actuator arrangement 230 is configured such that the angle $\alpha_2$ depends on the angular speed of the rotating second body 120, i.e. the aspect (b).

The rotational friction brake 200 is similar to the rotational friction brake 100 except that, instead of the flexible mass element 170 of the rotational friction brake 100, the internal flexibility is realized by allowing the actuator arm 240 to comprise two flexibly connected arm elements 240a, 240b. In other words, the actuator arm comprises two or more actuator arm elements 240a,240b which are flexibly, and rotationally, connected to each other so as to provide at least a part of said internal flexibility of the actuator arrangement 230. As shown in FIG. 2, the actuator arm comprises a first actuator arm element 240a and a second actuator arm element 240b, wherein the first actuator arm element 240a is rotationally attached to the pivot point 126 in a proximal end thereof, and, at a distal end thereof, flexibly, and rotationally, connected to a proximal end of the second actuator arm element 240b. The actuator arm elements 240a, 240b are flexibly, and rotationally, connected to each other by means of a spring 270.

Figure 3:
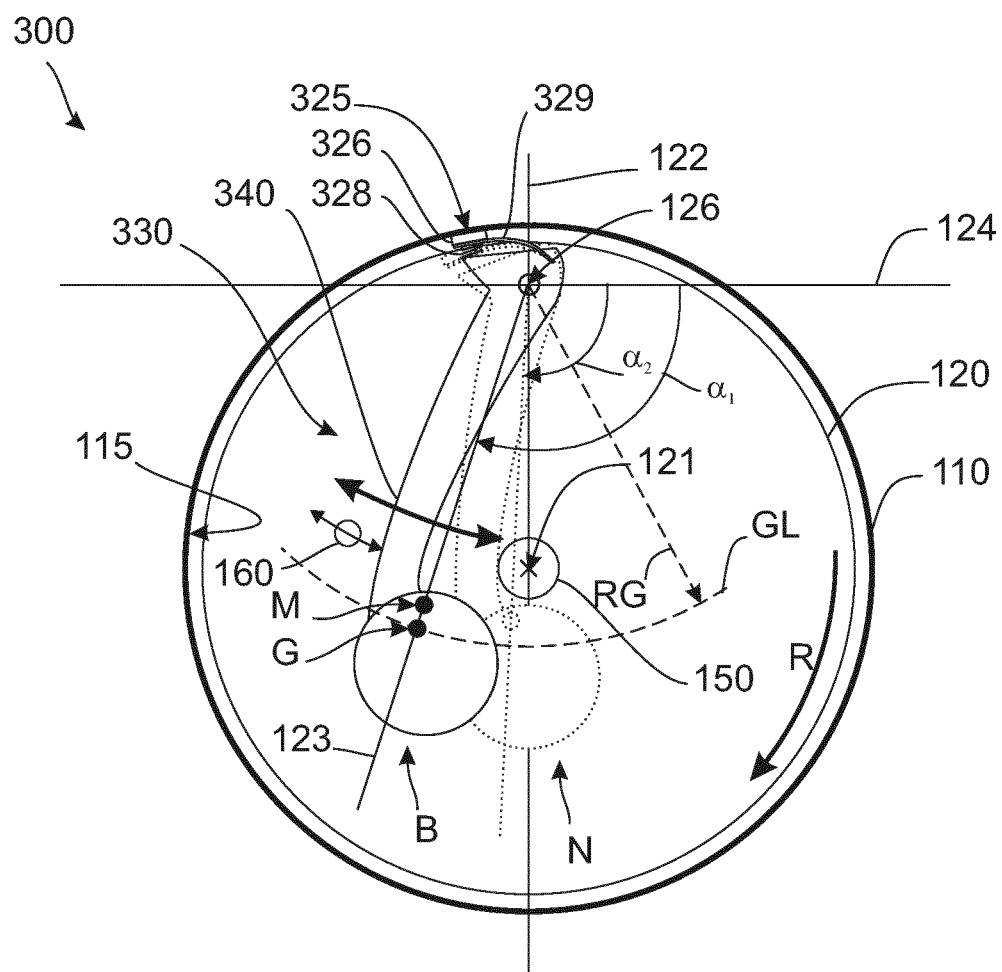
FIG. 3 shows a side view of a rotational friction brake according to another embodiment of the present disclosure.

FIG. 3 shows a rotational friction brake 300 according to another example embodiment. The rotational friction brake 300 is an example of a rotation friction brake wherein the internal flexibility of the actuator arrangement 330 is configured such that the angle $\alpha_1$ depends on the angular speed of the rotating second body 120, i.e. the aspect (a).

The rotational friction brake 300 is similar to the rotational friction brake 100 except that, instead of the flexible mass element 170 of the rotational friction brake 100, the internal flexibility is realized by allowing the actuator arm 340 to comprise a flexibly connected braking element 326. The braking element 326 comprises the second friction surface 325. The braking element 326 is flexibly connected to the actuator arrangement 330 be means of a torsional spring 328 and a piece of spring steel 329. If, when the actuator arrangement 130 is residing in the non-braking position N, the angular speed of the rotating second body 120 increases, the braking element 326 will experience increasing centrifugal forces which in turn will decrease the distance between the braking portion 326 and the first friction surface 115 of the first body 110. Hence, the angle $\alpha_1$ will decrease with increasing angular speed. As the rate of change of the angular speed has reached an activation threshold, the actuator arrangement 330 will move to the braking position B. At high angular speed, the actuation arrangement 330 has a shorter distance to move, hence increasing speed of activation. Note, however, that contrary to the embodiments of FIGS. 1 and 2, the actuation properties of the actuation arrangement 330 of the example is not affected by the angular speed.

Figure 4:
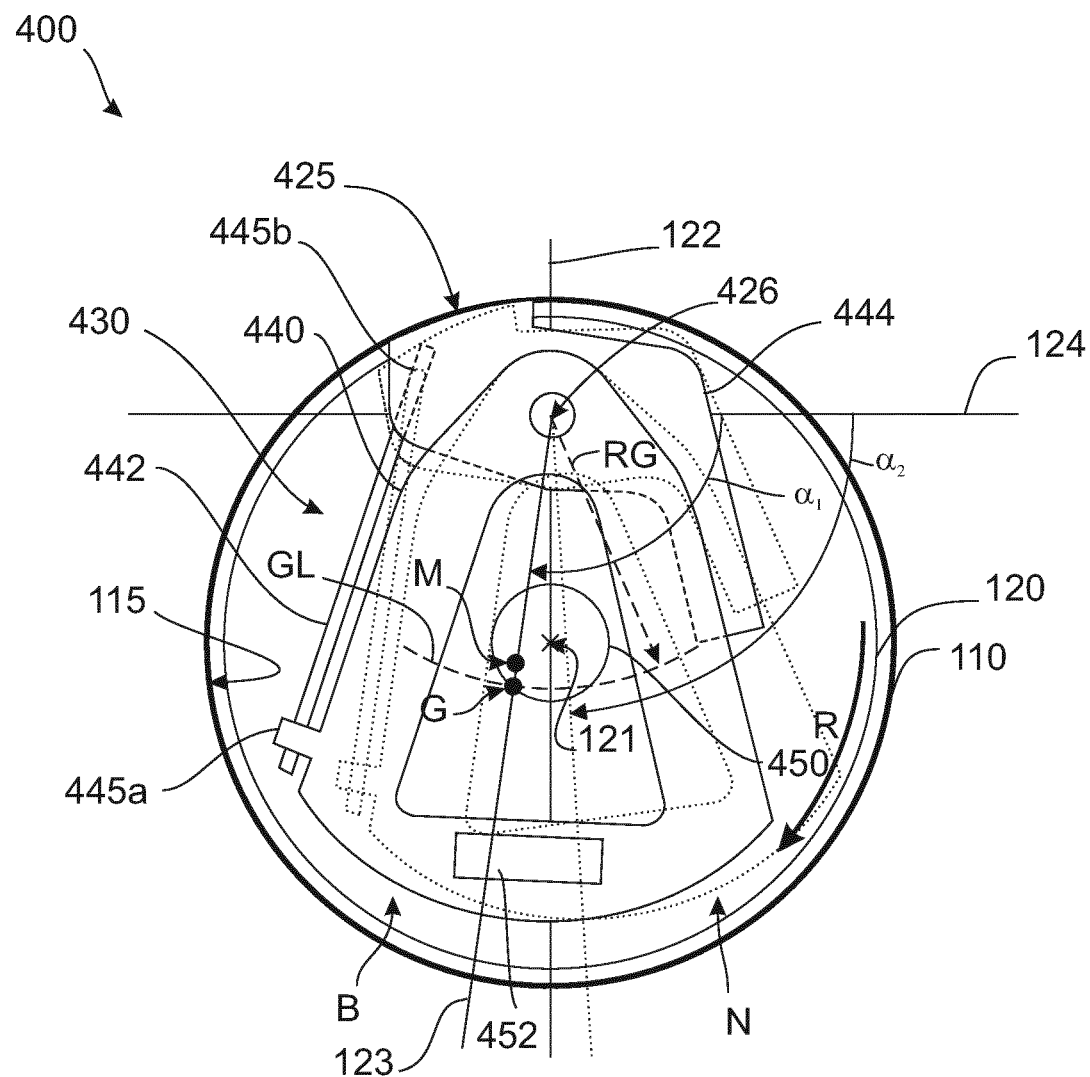
FIG. 4 shows a side view of a rotational friction brake according to another embodiment of the present disclosure.

FIG. 4 shows a rotational friction brake 400 according to another example embodiment. The rotational friction brake 400 is an example of a rotation friction brake wherein the internal flexibility of the actuator arrangement 440 is configured such that the angle $\alpha_2$ depends on the angular speed of the rotating second body 120, i.e. the aspect (b).

The rotational friction brake 400 is similar to the rotational friction brake 100 except that, instead of the flexible mass element 170 of the rotational friction brake 100, the internal flexibility is realized by allowing the actuator arrangement 430 to comprise an actuator arm 440 together with a further element 444 which, together, provide the internal flexibility. The further element 444 is configured to rotate together with the second body 120 and being pivotably attached to the second body 120 in the pivot point 426. The actuator arm 440 and the further element 444 are flexibly connected to each other so as to provide said internal flexibility of the actuator arrangement 430. The actuator arm 440 and the further element 444 are flexibly connected to each other by means of a spring steel element 442. The further element 444 comprises the second friction surface 425.

The example embodiment of FIG. 4 is an example of a rotational friction brake in which the actuator arrangement contains more than one element. For such embodiments, the geometrical mass center M and radius of gyration RG of the actuator arrangement 130 will differ from the geometrical mass center and radius of gyration of the actuator arm alone.

Furthermore, the example embodiment of FIG. 4 is an example of a rotational friction brake having an actuator arrangement providing a relatively wide spatial distribution of its mass compared to other example embodiments presented herein. To provide a radius of gyration RG longer than the distance between the pivot point 426 and the rotational center axis 121, the actuator arm 440 comprises a weight element 452 at a distal end thereof. As readily realized by the skilled person, the shape of the actuator arrangement may influence the actuation properties of the brake as centrifugal forces and inertial forces will, at least to some degree, depend on the spatial distribution of mass.

Figure 5:
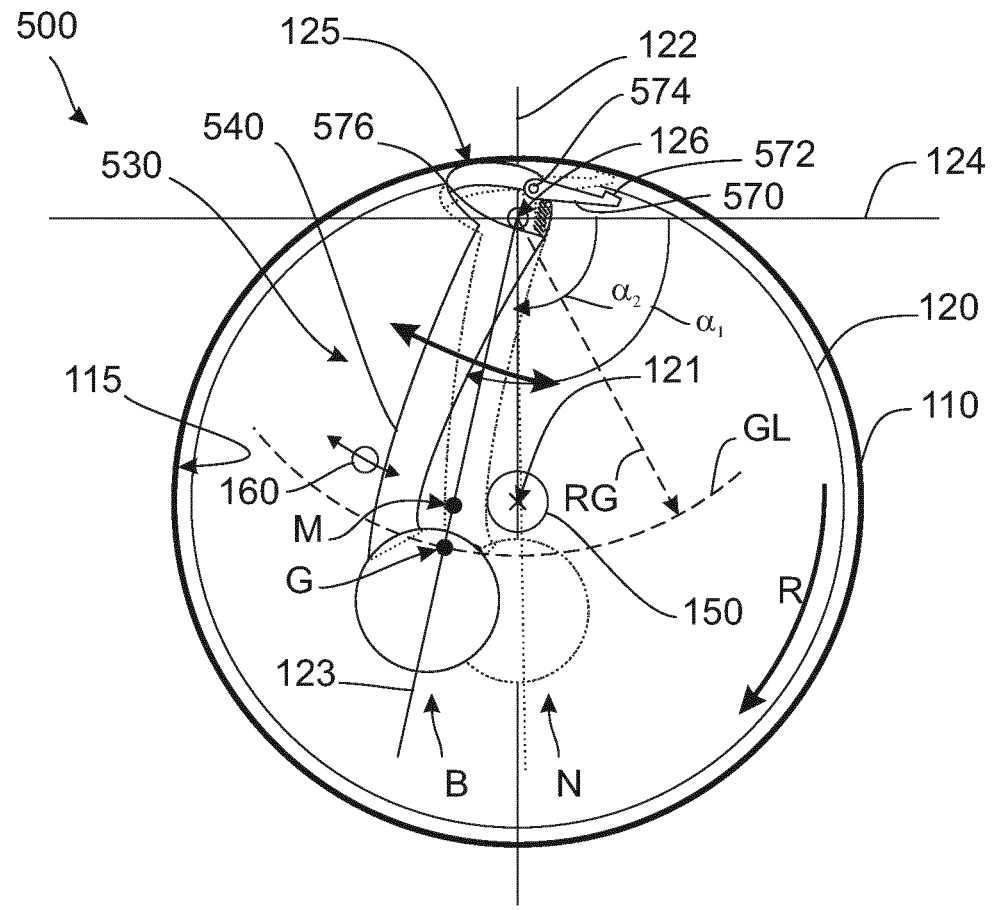
FIG. 5 shows a side view of a rotational friction brake according to another embodiment of the present disclosure.

FIG. 5 shows a rotational friction brake 500 according to another example embodiment. The rotational friction brake 500 is an example of a rotation friction brake wherein the internal flexibility of the actuator arrangement 530 is configured such that a portion of the actuator arrangement 530, when being in the non-braking position N, makes contact with a portion of the first 110 or second 120 bodies (in the example embodiment, contact is made to a portion of the first body 110) in response to the angular speed of the second body 120 exceeding an angular speed threshold, thereby transmitting a force from said contact to the actuator arm 540 so as to facilitate actuation of the brake 500, i.e. the aspect (c).

The rotational friction brake 500 is similar to the rotational friction brake 100 except that the internal flexibility is realized by allowing the actuator arrangement 530 to make contact with the first body 110 also when the actuator arrangement 530 is in the non-braking position N, as detailed above. For this purpose, the actuator arrangement 530 of the example embodiment comprises an actuator arm 540 comprising an actuation lever 570 flexibly connected to the actuator arm 540. The actuation lever 570 comprises a contact member 572 configured to make contact with the first friction surface 115 of the first body 110. The actuation lever 570 is pivotally attached to the actuator arm 540 in a pivot point 574 and is allowed to be flexibly rotatable around the pivot point 574 by means of a spring 576 which flexibly connects the actuation lever 570 to the actuator arm 540. During operation of the brake 500, when the actuator arrangement 530 is in the non-braking position N as a result from inertial forces e.g. during a positive rate of change of the angular speed, the actuation lever 570 will experience increasing centrifugal forces with increasing angular speed. If the angular speed exceeds an angular speed threshold, the actuation lever 570 has moved towards the first body 110 such that the contact member 572 makes contact with the first friction surface 115. The contact will result in a force which will be transferred to the actuator arrangement 530 so as to decrease the rate of change of the angular speed at which the actuator arrangement 530 will leave the non-braking position N to actuate the brake 500. Thus, the actuation lever 570 should not be construed as a further braking element. Instead the activation lever 570 is configured to affect the actuation arrangement 530 so as to facilitate actuation of the brake 500.

The example embodiment of FIG. 5 relies on said portion of the actuator arrangement 530, when being in the non-braking position N, making contact with a portion of the first body 110. However, the technical effect may alternatively be obtained by allowing the portion of the actuator arrangement 530, when being in the non-braking position N, to make contact with a portion of the second body 120.

Figure 6:
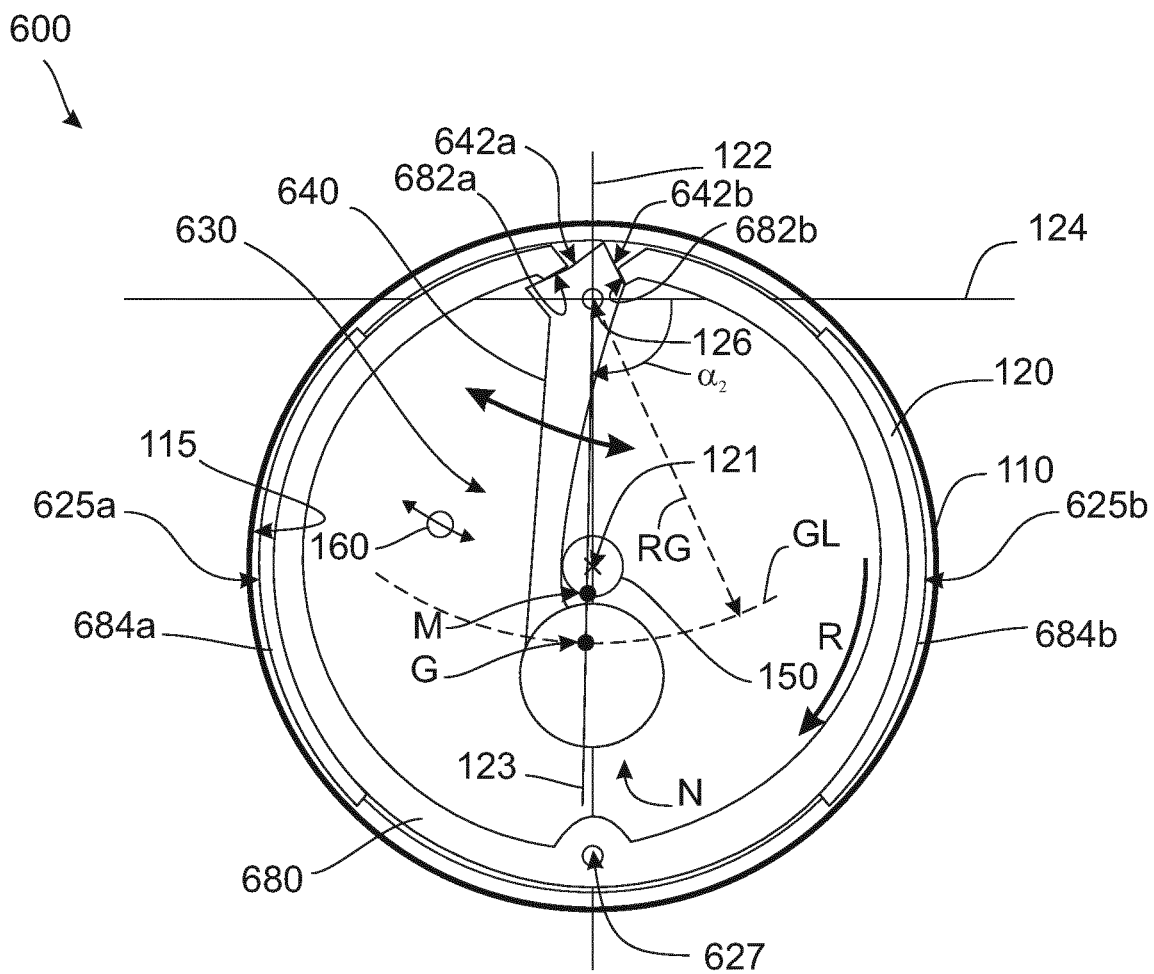
FIG. 6 shows a side view of a rotational friction brake according to another embodiment of the present disclosure.

FIG. 6 shows a rotational friction brake 600 according to another embodiment. The rotational friction brake 600 differs from the rotational friction brakes of FIGS. 1-5 in that it comprises a separate element which is configured to act as an intermediate element between the actuator arrangement and the first body. The rotational friction brake 600 may comprise any actuator arrangement within the scope of the claims Such actuator arrangements may for example share structural features with any of actuator arrangements disclosed in FIGS. 1-5. Thus, the actuator arrangement is only schematically shown in FIG. 6, leaving out specific structural features related to its internal flexibility.

The rotational friction brake 600 differs from the rotational friction brakes of FIGS. 1-5 in that the brake 600 further comprises a braking arrangement 680 configured to rotate together with the second body 120. The braking arrangement 680 will act as an intermediate element between the actuator arrangement 630 and the first body 110 and for that purpose the braking arrangement 680 comprises the second friction surface 625a,625b. In the example embodiment of FIG. 6, the braking arrangement is a single element, termed the engaging element 680. The engaging element 680 comprises a first braking member 684a and a second braking member 684b, which together form the second friction surface 625a,625b. The engaging element 680 is connected to the second body 110 in a connection point 627. The engaging element 680 is flexible so as to allow the first 684a and second 684b braking members to further distance themselves from each other so as to come into contact with the first body 110 during actuation of the brake 600. The engaging element 680 has abutment surfaces 682a,682b being in abutment with corresponding abutment surfaces 642a,642b of the actuator arrangement 640. This allows the actuator arrangement 630 to move the abutment surfaces 682a,682b of the engaging element 680 to move, or stretch, the engaging element 680 such that the second friction surface 625a,625b is moved towards the first friction surface 115 to actuate the brake 600.

The rotational friction brake of the disclosure may be useful for several purposes. Generally, it may be useful for all rotating objects having, sometimes unwanted, rotational patterns caused by inertia. Typically, the rotational brake is useful acting as an automatic emergency brake, overspeed brake or the like. Applications include use within centrifuges, turbines, wind mills, wheels, drums, boom barriers etc. The rotational friction brake may be used in applications where unwanted motion caused by inertia needs to be controlled by evening out the delta between torque and inertia. Torque can originate from the rotational axle of the rotational second body on which the brake system is mounted, or from a force originating from the unwinding of material off a spool arranged to rotate with the second body.

The brake system may achieve different results; as an emergency brake system activating at sudden and large changes in torque, or as a tension control system activating when torque fluctuates. These configurations can be combined for specifically troublesome applications where both emergency braking and tension control is needed i.e. fishing reels.

In power supply networks, power generation and electrical load needs to be balanced to avoid overload. In the event of a sudden electrical load cut off in the distribution grid, power generation loses its resistance causing sudden overspeed on generators connected to turbines. Using the disclosed invention could supply a better fail-safe braking mechanism.

The same principles apply to motors when torque suddenly stops, inertia continues rotation and electricity needs to dissipate in a controlled fashion. Dissipation of electricity is normally managed by complex electrical systems or mechanical non-autonomous brakes. The unwanted motion could be prevented more efficiently with the disclosed rotational friction brake.

Inertia may cause serious accidents, and unwanted motion caused by inertia on trailers can also be reduced using the disclosed invention. Efforts to prevent trailer jack-knife accidents and ease handling include complex electrical systems, easily switched off by the driver, and mechanical surge brakes. Mounting the rotational friction brake of the disclosure on one or more wheels on the trailer will allow autonomous braking as soon as driving torque decreases or stops altogether.

As previously mentioned, the rotational friction brake of the disclosure may be specifically useful for applications where relatively high angular speeds are required during a phase of a positive rate of change of the angular speed, but braking is required during a phase of negative rate of change of the angular speed. A typical example of applications where this may be useful is systems such as e.g. cable drums, water hoses, large paper rolls and sewing thread rolls. Another example is windlasses, for example anchor windlasses used for restraining and manipulating the anchor chain on a boat, allowing the anchor to be raised and lowered by means of a cable. These systems typically comprise a product (e.g. a cable, a hose, paper or thread) which in its nature is bendable and elongated, arranged to be winded onto a spool at a plurality of revolutions.

Figure 7:
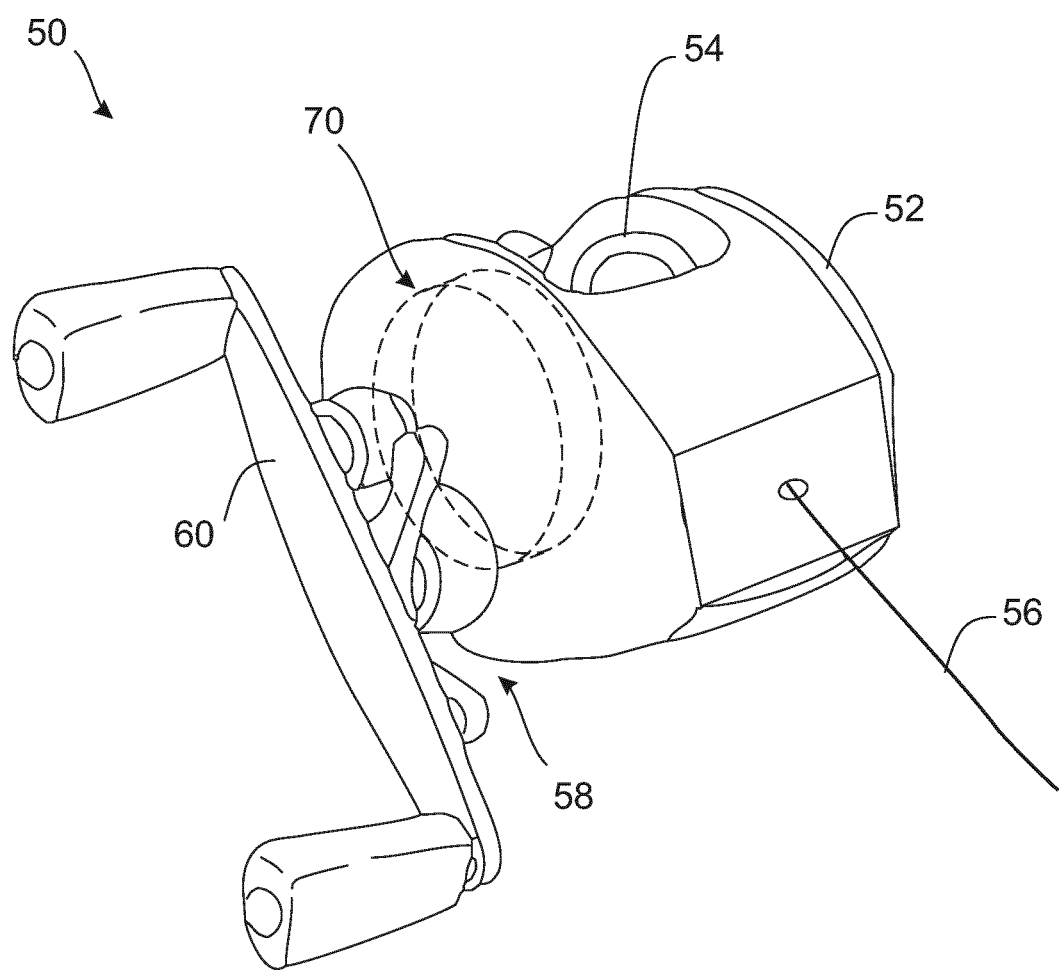
FIG. 7 shows a perspective view of a fishing reel comprising a rotational friction brake of a kind disclosed herein.

A further example of such an application is a fishing reel. FIG. 7 shows a fishing reel 50 comprising a housing 52 and a line spool 54 rotationally attached to the line spool 52. The line spool 54 is configured to house a fishing line 56 wound around the line spool 54 at a plurality of revolutions. The fishing reel further comprises a rewinding interface 58 arranged for allowing to rewind the fishing line 56 onto the line spool. The rewinding interface 58 is controlled by a handle 60. The fishing reel 50 further comprises the rotational friction brake 70. The rotational friction brake 70 is arranged to provide braking to the spool during casting of the line such as to prevent backlash. In the embodiment, the rotational friction brake 70 is a rotational friction brake according to the disclosure. Thus, it is understood that the rotational friction brake 70 may be any one from the embodiments disclosed herein. It is further to be understood that the rotational friction brake may be any embodiment of a rotational friction brake within the scope of the appended claims An example of such a rotational friction brake is the rotational friction brake 100 shown in FIG. 1. Using this as an example, the first body 110 is part of, or fixedly attached to, the housing 52 of the fishing reel 50 and the second body 112 is part of, fixedly attached to or arranged to engage with the line spool 54.

The person skilled in the art realizes that the present invention by no means is limited to the preferred embodiments described above. On the contrary, many modifications and variations are possible within the scope of the appended claims.

For example, actuator arms of different design may be used on the same rotational friction brake. The actuator arms may be arranged to frictionally engage the first body in different ways. The actuator arms may be arranged to activate at different threshold levels of the acceleration of the second body. Additionally, variations to the disclosed embodiments can be understood and effected by the skilled person in practicing the claimed invention, from a study of the drawings, the disclosure, and the appended claims

The invention claimed is:

1. A rotational friction brake actuated and regulated by a rate of change of angular speed, the rotational friction brake comprising:
   a first body having a first friction surface,
   a second body rotationally attached to the first body, the second body being configured to rotate around a rotational center axis of the second body,
   an actuator arrangement configured to move a second friction surface into frictional engagement with the first friction surface, the second friction surface being configured to rotate together with the second body, the actuator arrangement comprising:
      an actuator arm being configured to rotate together with the second body and being pivotably attached to the second body in a pivot point, wherein the pivot point is eccentrically offset to the rotational center axis along a radial axis,
      wherein the actuator arrangement has a geometrical mass center, the pivot point and the geometrical mass center defining an actuator axis,
      wherein the actuator arrangement further has a radius of gyration relative to the pivot point as seen in the actuator arrangement's rotation together with the second body, the radius of gyration being longer than a distance between the pivot point and the rotational center axis,
      wherein the actuator axis intersects the pivot point, forming an angle to a normal axis, the normal axis being defined perpendicular to the radial axis through the pivot point, and
      wherein the second friction surface is arranged to frictionally engage with the first friction surface for values of the angle being equal to, or larger than, a first angle, and
   a stop member configured to limit the movement of the actuator arrangement relative to the second body, such that the angle is limited to a minimum angle larger than a second angle, at which angle the actuator arrangement is in a non-braking position,
   wherein the first angle is larger than the second angle, and wherein the second angle is within the range from 80° to 100°, and
   wherein the actuator arrangement has an internal flexibility which allows a shape of the actuator arrangement to depend on centrifugal forces acting thereon, said internal flexibility being configured such that:
      (a) the first angle depends on the angular speed of the rotating second body, and/or
      (b) the second angle depends on the angular speed of the rotating second body, and/or
      (c) a portion of the actuator arrangement, when being in the non-braking position, makes contact with a portion of the first and/or second bodies in response to the angular speed of the second body exceeding an angular speed threshold, thereby transmitting a force from said contact to the actuator arm so as to facilitate actuation of the brake,
   wherein the actuator arrangement is configured to move in relation to the second body from the non-braking position to a braking position at which the second friction surface comes into frictional engagement with the first friction surface so as to actuate the rotational friction brake.

2. The rotational friction brake according to claim 1, wherein the first body is a drum and wherein the first friction surface is an inner portion of a peripheral wall of the drum.

3. The rotational friction brake according to claim 1, wherein the actuator arrangement has a center of gyration being distanced from the pivot point by the radius of gyration, wherein, when the actuator arrangement is in the non-braking position, the center of gyration of the actuator arrangement is located on one side of a plane, wherein the plane is orthogonal to the radial axis and intersects the rotational center axis, and wherein the center of gyration of the actuator arrangement is located on the side of the plane not containing the pivot point.

4. The rotational friction brake according to claim 1, further comprising a preventing member arranged to be adjustable, allowing for the angle to be limited to a maximum angle smaller than the first angle, such that the preventing member prevents the second friction surface from frictionally engaging with the first friction surface.

5. The rotational friction brake according to claim 1, wherein said internal flexibility is configured at least such that the second angle depends on the angular speed of the rotating second body, and
   wherein the actuator arm comprises a mass element flexibly connected thereto, wherein the mass element is displaceable along a displacement direction which forms an angle with the actuator axis, so as to provide at least part of said internal flexibility of the actuator arrangement.

6. The rotational friction brake according to claim 1, wherein said internal flexibility is configured at least such that the second angle depends on the angular speed of the rotating second body, and
   wherein the actuator arm comprises two or more actuator arm elements which are flexibly connected to each other so as to provide at least a part of said internal flexibility of the actuator arrangement.

7. The rotational friction brake according to claim 1, wherein said internal flexibility is configured at least such that the second angle depends on the angular speed of the rotating second body, and
   wherein the actuator arrangement further comprises a further element being configured to rotate together with the second body and being pivotably attached to the second body in the pivot point, wherein the actuator arm and the further element are flexibly connected to each other so as to provide at least a part of said internal flexibility of the actuator arrangement.

8. The rotational friction brake according to claim 1, wherein the actuator arrangement further comprises the second friction surface fixedly, or flexibly, connected to the actuator arm.

9. The rotational friction brake according to claim 8, wherein the actuator arm comprises the second friction surface.

10. The rotational friction brake according to claim 8, wherein said internal flexibility is configured at least such that the first angle depends on the angular speed of the rotating second body, and
    wherein the actuator arrangement comprises a braking element comprising the second friction surface, wherein said braking element is flexibly connected to the actuator arrangement, and/or being in itself flexible, such that the first angle-depends on the angular speed of the rotating second body so as to provide at least a part of said internal flexibility of the actuator arrangement.

11. The rotational friction brake according to claim 1, wherein said internal flexibility is configured at least such that a portion of the actuator arrangement, when being in the non-braking position, makes contact with a portion of the first or second bodies in response to the angular speed of the second body exceeding an angular speed threshold, thereby transmitting a force from said contact to the actuator arm so as to facilitate actuation of the brake, and wherein the actuator arrangement further comprises an actuation lever flexibly connected to the actuator arrangement, and wherein said portion of the actuation arrangement is a contact member of the actuation lever, and said portion of the first or second bodies is the second friction surface.

12. The rotational friction brake according to claim 1, further comprising a braking arrangement configured to rotate together with the second body, wherein the braking arrangement comprises the second friction surface.

13. The rotational friction brake according to claim 12, wherein the braking arrangement is an engaging element comprising the second friction surface, said engaging element having abutment surfaces being in abutment with corresponding abutment surfaces of the actuator arrangement, such that the actuator arrangement is configured to move the abutment surfaces of the engaging element to move, or stretch, the engaging element such that the second friction surface is moved towards the first friction surface to actuate the brake.

14. The rotational friction brake according to claim 1, wherein the second body is part of, fixedly attached to or arranged to engage with a spool arranged to contain an elongated bendable object, wherein the elongated bendable object is winded around the spool at a plurality of revolutions.

15. A fishing reel comprising the rotational friction brake according to claim 1 wherein the first body is part of, or fixedly attached to, a housing of the fishing reel and the second body is part of, fixedly attached to or arranged to engage with a line spool.

\* \* \* \* \*